Figure 1:
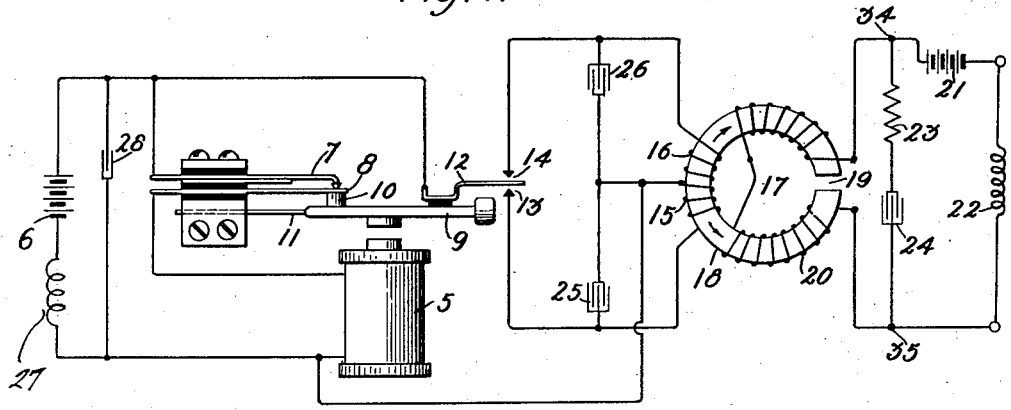

G. C. CRAWFORD & G. H. STEVENSON.
GENERATING SYSTEM.
APPLICATION FILED AUG. 2, 1917.

1,296,269.

Patented Mar. 4, 1919.
2 SHEETS—SHEET 1.

Inventors:
Gustavus C. Crawford.
George H. Stevenson.
by J. C. Roberts Att'y.

G. C. CRAWFORD & G. H. STEVENSON.
GENERATING SYSTEM.
APPLICATION FILED AUG. 2, 1917.

1,296,269.

Patented Mar. 4, 1919.
2 SHEETS—SHEET 2.

Inventors:
Gustavus C. Crawford.
George H. Stevenson.
by J. G. Roberts
Att'y

UNITED STATES PATENT OFFICE.

GUSTAVUS C. CRAWFORD, OF EAST ORANGE, NEW JERSEY, AND GEORGE H. STEVENSON, OF MOUNT VERNON, NEW YORK, ASSIGNORS TO WESTERN ELECTRIC COMPANY, INCORPORATED, OF NEW YORK, N. Y., A CORPORATION OF NEW YORK.

GENERATING SYSTEM.

1,296,269.  Specification of Letters Patent.  Patented Mar. 4, 1919.

Application filed August 2, 1917. Serial No. 184,073.

*To all whom it may concern:*

Be it known that we, GUSTAVUS C. CRAWFORD and GEORGE H. STEVENSON, subjects of the King of Great Britain, residing at East Orange, in the county of Essex and State of New Jersey, and at Mount Vernon, in the county of Westchester and State of New York, respectively, have invented certain new and useful Improvements in Generating Systems, of which the following is a full, clear, concise, and exact description.

This invention relates to systems of generating alternating or pulsating electric currents of any desired periodicity, and more particularly to a system for converting unidirectional current into alternating or pulsating current by the coöperation of a vibrating interrupter and a transformer.

Systems of this kind have been used heretofore, but difficulties have been experienced in applying them to commercial use because of the peaked wave form of the alternating or pulsating current derived therefrom. At the instant of breaking the primary circuit of the transformer there is a sudden change of flux in the transformer core which gives rise to an exceedingly high peak value for the voltage induced in the secondary winding. Again at the closing of such circuit another sudden change in flux value takes place which gives rise to other peaks which are also detrimental to satisfactory commercial use. Another difficulty has been experienced in applying the systems, heretofore known, to commercial use, where it is desired to obtain an asymmetrical alternating or pulsating current wave form by superimposing the alternating current upon a unidirectional current for operating polarized apparatus used in signaling systems. Although such unidirectional current tends to overcome the polarization and thereby improve the operation of such apparatus, its effect upon the core of the transformer causes a serious distortion of the alternating current wave form which renders the resultant wave form highly unsatisfactory, since the high voltages obtained therefrom often introduce fire hazards.

One feature of the invention is the use of capacity and resistance in combination with the secondary winding of the transformer to smooth out the alternating current wave produced by the interruption and reversal of the current in the primary winding of the transformer. Another feature of this invention is the combination of a non-magnetic gap in the magnetic circuit of the transformer, a unidirectional current through the secondary winding, and a series circuit comprising a resistance and capacity, bridged across the terminals of the secondary winding in order to obtain an asymmetrical alternating or a pulsating current wave form, free from objectional transient peaks and to eliminate hazardous voltage values.

These features have for their objects the production of an alternating or pulsating current wave form of maximum power and minimum peak values.

The invention will be more clearly understood by reference to the drawings wherein:—

Figure 2:
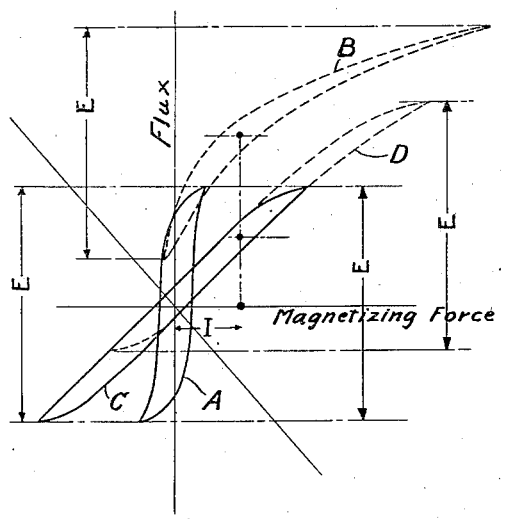
Figure 3:
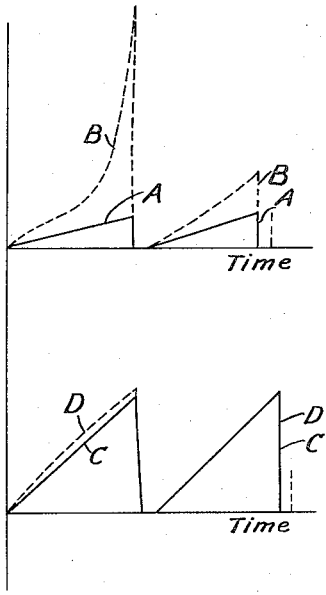
Figure 4:
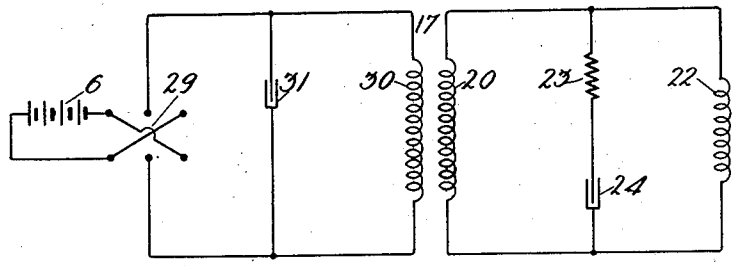
Figure 5:
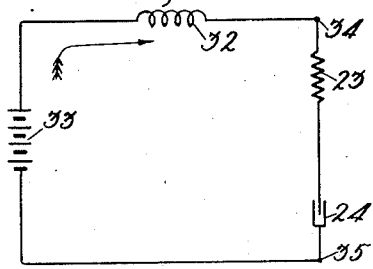
Figure 6:
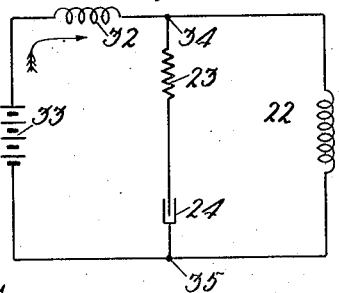
Figure 7:
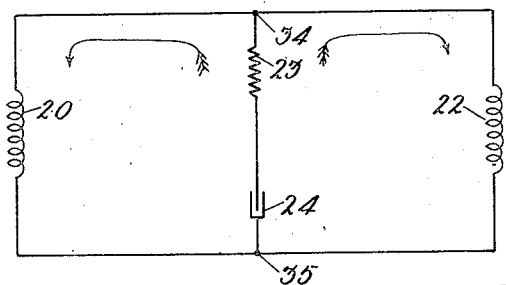
Figure 8:
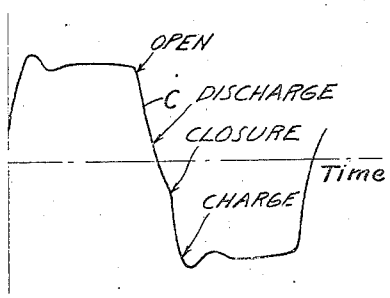
Figure 9:
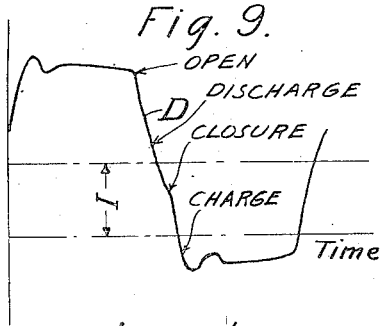

Figure 1 is a diagram of a system for producing asymmetrical alternating or pulsating currents in accordance with one embodiment of this invention; Fig. 2 illustrates comparatively the cyclic magnetization of the transformer core during operation with and without superimposed unidirectional current in the secondary winding, and with and without a non-magnetic gap in the core of the transformer; Fig. 3 shows the corresponding current impulses in the primary windings produced by the unidirectional source of current; Fig. 4 is a conventional representation of the system of Fig. 1, which is shown for clearness of description; Figs. 5 and 6 are of like character showing respectively no-load and loaded conditions of a system at the instant of closing the circuit; while Fig. 7 is a similar representation showing the condition at the instant of opening the circuit; Figs. 8 and 9 show substantially the form of the current waves obtained from the system of Fig. 1 with and without superimposed unidirectional current flowing through the secondary winding.

Corresponding elements in the several figures of the drawings are designated by similar reference characters.

Referring now to Fig. 1, 5 is a motor magnet of an interrupter adapted to be energized from a battery 6. Included in the energizing circuit of motor magnet 5 is a contact spring 7 having engagement with an interrupter spring 8, which is controlled by a vibrating armature 9 through an insulating pin 10; the armature 9 being flexibly mounted in operative relation to the motor magnet 5 by means of a spring 11. The armature 9 also carries a contact spring 12 insulated therefrom and adapted upon vibration of the armature 9 to make contact alternately with contact members 13 and 14. One terminal of the battery 6 is connected to contact spring 12, while the other terminal is connected through an inductance 27 to the common point of primary windings 15 and 16 of a split-primary transformer 17. The other terminals of windings 15 and 16 are connected respectively to contact members 13 and 14. The vibration of armature 9, therefore, causes the energization in alternate directions of transformer core 18 by the windings 15 and 16. A non-magnetic gap 19 is provided in the core 18 of the transformer for a purpose hereinafter to be described. The change in magnetization of the core induces a voltage in the secondary winding 20 of the transformer which causes alternating current to flow through a battery 21 and a work load 22; a resistance 23 connected in series with a capacity 24 being bridged across the terminals of the secondary winding 20 in order to reduce the peak value of the resultant current wave. In order to reduce the sparking between contact spring 12 and contact members 13 and 14, small capacities 25 and 26 are connected in bridge respectively of primary windings 15 and 16. In the preferred form of this invention there is also provided an inductance 27, connected in series relation with the battery 6 and a condenser 28 bridged across both the battery and the inductance, the object being to reduce noise in the system.

The effect of the capacity 24 and resistance 23 in reducing the transient peaks ordinarily present in the alternating current wave forms obtained from systems of this kind can be better seen by reference to Fig. 4, which shows conventionally the circuit of Fig. 1 with the battery 21 omitted. The interrupter of Fig. 1 has been superseded by the reversing switch 29, the two primary windings 15 and 16 by a single winding 30 and the spark-reducing capacities 25 and 26 by the capacity 31.

In its simplest form the voltage wave in such a system would consist of two equal rectangular portions, positive and negative, with a short period of zero voltage corresponding to the interval of open circuit as the vibrator contact spring 12 is passing from the one contact to the other or as the reversing switch 29 is being thrown from right to left or vice versa. Such a wave can only be obtained, however, when the circuit supplied by the battery is entirely non-reactive. Since in actual cases the circuit is capable of storing energy either in its inductances or in its capacities, the changes in the circuit caused by the interruption of and reversal of currents induce oscillations of voltage and current as the stored energy is dissipated. At the instant of interruption there is one set of transient oscillations and at the instant of making contact there is another and separate set of phenomena.

The conditions of the system at the instant of closing the circuit are represented by Figs. 5 and 6; the former representing the condition when no external work load is connected to the system and the latter when an inductive work load represented by the inductive resistance 22 is connected thereto. The transformer 17 has been superseded by its leakage impedance represented by the inductive resistance 32 and the actual battery 6, by battery 33 whose voltage is larger than that of battery 6 in the ratio of the number of turns of the secondary winding to the number of turns of the primary winding or the turn-ratio of the transformer. Upon the interruption of the circuit of the primary winding 30, the current flowing therein is reduced to zero value practically instantaneously and the equivalent circuit may be shown as in Fig. 7, wherein the place of the transformer 17 has been taken by its secondary winding 20, while the work load 22, the resistance 23 and capacity 24 remain unchanged. In each of Figs. 5, 6 and 7, the small capacity 31 has been neglected since its effect upon the character of the generated currents under the various circuit conditions is entirely negligible.

At the instant just before the primary circuit is interrupted, energy is stored in the form of a magnetic field in the load 22 and in the core of the transformer 17. As soon as the circuit is broken the tendency of these magnetic fields is to diminish to zero value, with a corresponding flow of discharge current from the capacity 24 tending to oppose this diminution. This discharge takes the form of an oscillatory current, its periodicity and maximum amplitude corresponding to the maximum difference of potential between the points 34 and 35, which in turn depends upon the relative values of the impedance of the work load 22 and of the transformer secondary winding 20, the resistance 23 and the capacity 24, and were these oscillations not discontinued by the subsequent closing of the primary circuit, they would continue with decreasing amplitude until the stored energy would have been completely dissipated. These discharge oscillations, however, continue only during the open circuited period and are followed by a second set of oscillations or aperiodic impulses whose characteristics depend upon the circuit conditions shown in Figs. 5 and 6. The directions of the current flow at the instant of closing the circuit in Figs. 5 and 6 and the direction of flow of discharge current at the instant of breaking the circuit in Fig. 7 are indicated by the arrows.

By proper selection, therefore, of the capacity 24, not only can the maximum amplitude of the oscillatory voltage be reduced, but the time required for one complete oscillation can be increased. This possible maximum value moreover may be rendered ineffective by so adjusting the open circuit period that the circuit will be again closed before the maximum value has been attained. The function of the resistance 23 is primarily to limit the flow of current through the capacity 24 upon the closure of the primary circuit.

By connecting the capacity 24 and resistance 23 across the terminals of the secondary winding a much smaller value of capacity and resistance can be used than if all the capacity and resistance were located across the terminals of the primary winding, since the turn-ratio is comparatively large. In an actual case a value of 10 microfarads for capacity 24 and 400 ohms for the resistance 23, when used with a transformer having a turn-ratio of 25 has given satisfactory results. To accomplish the same results with the capacity 24 and resistance 23 connected across the primary winding would, therefore, require a condenser of approximately 250 microfarads' capacity.

Coming now to the magnetization of the core 18 of the transformer the nature of the magnetization under varying conditions will be clear from a reference to Fig. 2, where four conditions are shown. Curve A shows a magnetization loop for a continuous core transformer having a range of flux represented by the length of the line E. The range for a given transformer is determined solely by the applied voltage and the duration of contact. The effect of introducing a non-magnetic gap in the core is to change the shape but not the range of the magnetization loop, as shown by curve C. Referring again to the condition where the core of the transformer is continuous, the effect of passing a unidirectional current, whose constant magnetic force may be represented by the distance I in Fig. 2, through the secondary winding and superimposing thereon a changing magnetization, the magnetization loop shown by curve B is obtained. Under these conditions, if a non-magnetic gap is inserted in the core the resultant magnetization loop is shown by curve D.

It is noticeable that the shape of the magnetization loop D is very little changed from that of C, thereby showing that the shape of the asymmetrical alternating or pulsating wave form will be very little changed from the pure alternating current form. On the other hand, the distorted shape of the magnetization loop B compared with the magnetization loop A shows that a very marked change in the wave form would result from the superimposing of unidirectional current upon the secondary winding of a transformer without a non-magnetic gap in its core.

The shape of the current impulses supplied by the battery 6 to the primary winding of the transformer are shown in Fig. 3, where the reference letters refer to the impulses of current producing the similarly designated magnetization loops of Fig. 2. Due to the constants of the circuit the current supplied by the battery never reaches its constant value, as shown by the graphs of Fig. 3.

The shape of the corresponding voltage waves, which are impressed upon the load 22, is illustrated by Figs. 8 and 9; the curve of Fig. 8 showing the wave shape when no direct current is flowing in the secondary circuit and that of Fig. 9 when such current is flowing. The same reference letters of Figs. 2, 3, 8 and 9 refer to the changes occurring in the circuit during the same time intervals. The value of the direct current flowing in the secondary circuit and the magnetizing force corresponding thereto are represented by the distance I in Figs. 9 and 2 respectively. The voltage decreases rapidly when the contact member 12 leaves contact 13 or 14, as represented by the point on the curves designated as "Open" in Figs. 8 and 9 and continues to decrease while the condenser 24 is discharging, which period is indicated on the curves as "Discharge", until the contact member 12 connects with the opposite contact, as represented on the curves by the word "Closure", at which time the condenser 24 begins to receive a charge and continues to charge throughout the period represented by the word "Charge". It has been found that the wave form shown in Fig. 9 is very desirable for operating polarized electromagnetic devices and other devices requiring asymmetrical currents and for which high voltage peaks are objectionable. The similarity of the voltage waves of Figs. 8 and 9 demonstrates clearly the uniformity obtainable by means of a non-magnetic gap in the core of the transformer.

In the diagrams of Figs. 2 and 3, the effect of the oscillatory currents present during the open circuit period and at the instant of closing the circuit are not shown, as a matter of convenience. Their effect, however, is shown in the wave forms of Figs. 8 and 9.

It is obvious that without passing beyond the scope of this invention various modifications can be made in the primary winding of the transformer and in the method of connecting the interrupter thereto in order to obtain an interruption and reversal of the magnetic field in the core of the transformer. The character of the load represented by the impedance 22 is also immaterial, although the resultant wave form shown in Fig. 9 is peculiarly adapted for operating polarized ringers employed in connection with party telephone lines. The generating system as shown in Fig. 1 may, for instance, be employed instead of the generator $x$ of the signaling system disclosed by Patent No. 763,970, granted to Thomas C. Drake, July 5, 1904, in which case the battery 21 shown in Fig. 1 of the accompanying drawing would be omitted, and points 34 and 35 thereof would be connected to point $y$ of Fig. 1 of the patent and to ground respectively. In such an application of the system, the battery $j$ of the Drake patent, would replace the battery 21 of Fig. 1 of the accompanying drawing, while battery $i$ of the Drake patent, would serve in a corresponding manner to supply unidirectional current of the opposite polarity for operating ringers A and D.

What is claimed is:

1. An electric generating system comprising a transformer having primary and secondary windings, means for causing current to flow intermittently in said primary winding, and a bridging circuit comprising resistance and capacity in series connected to the terminals of the secondary winding of the transformer.

2. In an electric generating system, a transformer having primary and secondary windings, a tuned interrupter for controlling current in said primary winding, a source of energizing current for said primary winding, and a bridge circuit connected to the terminals of said secondary winding, said bridging circuit comprising a resistance and a capacity connected in series relationship.

3. An electric generating system comprising a transformer having primary and secondary windings and a core having a non-magnetic gap therein, means for causing current to flow intermittently in said primary winding, a source of unidirectional current in series relation with the secondary winding of the transformer, and a condenser in bridge across the terminals of said secondary winding.

4. An electric generating system comprising a transformer having primary and secondary windings and a core having a non-magnetic gap therein, means for causing current to flow intermittently in said primary winding, a source of unidirectional current in series relation with the secondary winding of the transformer, and a bridging circuit connected to the terminals of the secondary winding of the transformer, said bridging circuit comprising a resistance and a capacity connected in series relationship.

5. In an electric generating system, a transformer having primary and secondary windings and a core having a non-magnetic gap therein, a tuned interrupter for controlling current in said primary winding, a source of energizing current for said primary winding, a source of unidirectional current in series relation with the secondary winding of the transformer, and a condenser in bridge across the terminals of said secondary winding.

6. In an electric generating system, a transformer having primary and secondary windings and a core having a non-magnetic gap therein, a tuned interrupter for controlling current in the primary winding of the transformer, a source of energizing current for said primary winding, and a bridge circuit connected in parallel with the secondary winding of the transformer, said bridging circuit comprising a resistance and a capacity in series relationship.

In witness whereof, we hereunto subscribe our names this 1st day of August, A. D., 1917.

GUSTAVUS C. CRAWFORD.
GEORGE H. STEVENSON.